J. A. BOWDEN.
PRESSURE GAGE.
APPLICATION FILED JULY 27, 1910. RENEWED AUG. 20, 1918.
1,306,245.
Patented June 10, 1919.
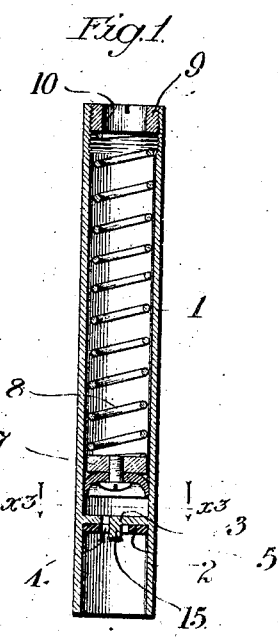
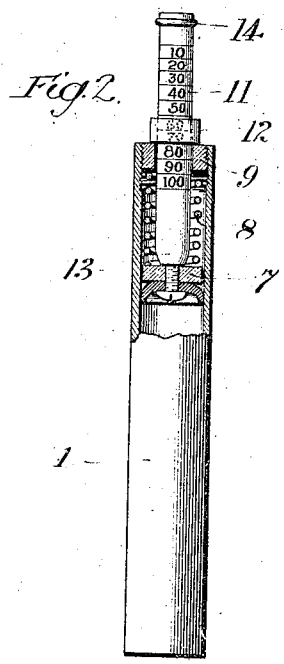
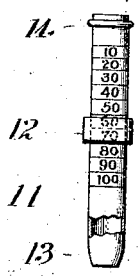
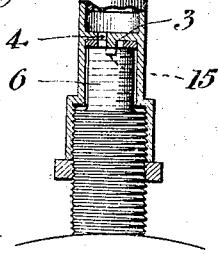
Witnesses:
Inventor:
Junius A. Bowden

UNITED STATES PATENT OFFICE.

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

PRESSURE-GAGE.

1,306,245.  Specification of Letters Patent.  Patented June 10, 1919.

Application filed July 27, 1910, Serial No. 574,176. Renewed August 20, 1918. Serial No. 250,753.

*To all whom it may concern:*

Be it known that I, JUNIUS A. BOWDEN, a citizen of the United States, residing at Los Angeles, in the county of Los Angeles and State of California, have invented a new and useful Pressure-Gage, of which the following is a specification.

This invention relates to pressure gages adapted to be applied to the air valve of a pneumatic tire for determining the pressure of air within the tire. In the present invention the registering device is capable of being removed from the air cylinder so that the registering device may be readily inspected when in a more convenient position than if it had to be inspected while the pressure gage was applied to the tire.

A further advantage of the present invention is that the air cylinder portion of the device may be screwed to the valve stem of the tire and may remain there, there being four air cylinders provided for the respective tires of the vehicle, and when it is desired to determine the pressure, the registering device may be inserted into the air cylinder which is connected to the tire in which the pressure is to be determined, and when inserted therein the registering device will be set to indicate the pressure, after which it may be withdrawn from the air cylinder and inspected in a favorable position. It should be understood, however, that the present invention is not confined to the air cylinder being always carried bodily by the valve of the tire as the present invention contemplates the air cylinder being used as a gage to be momentarily applied to the valve to determine the pressure or to be attached thereto and carried bodily by the valve.

Referring to the drawings:

Figure 1 is a longitudinal section through one form of the invention with the registering device removed.

Fig. 2 is a side elevation of the form shown in Fig. 1 showing the registering device in position for registering the pressure.

Fig. 3 is a section on line $x^3$—$x^3$ Fig. 1.

Fig. 4 is a side elevation of the registering device in detail and partly in section.

Fig. 5 is a perspective of the frictional sleeve of the registering device.

Fig. 6 is a side elevation partly in section of another form of the gage.

In the form shown in Figs. 1 and 2 the gage comprises an air cylinder 1, the lower end of which is formed as a hollow extension 2 which is adapted to be applied over the valve stem of the tire, there being a partition 3 which separates the air cylinder 1 from the extension 2, the partition 3 having a port 4 for the entrance of air to the cylinder 1, and a washer 5 of rubber or other packing material is provided on the lower side of the partition 3 to form an air tight closure with the valve stem indicated at 6, Fig. 6.

Within the air cylinder 1 is a piston 7, and a spring 8 bears against the piston 7, and tends to normally hold it near the lower end of the cylinder 1, the upper end of the spring bearing against a disk or end piece 9, which is screwed in the upper end of the air cylinder 1 and by means of which the pressure of the spring 8 may be regulated. Disk or end piece 9 has a central perforation 10 which receives a registering device 11 which is in the form of a tube, as clearly shown in Fig. 4, and which is provided with a split sleeve 12 shown in detail in Fig. 5, which is slidable on the tube 11, and is frictionally held in any position thereon into which it may be set. The lower end of the indicating device 11 is contracted as shown at 13, which enables the indicating device to be readily slipped through the perforation 10 and placed in the position shown in Fig. 2. The upper end of the indicating device 11 has a flange 14 to enable it to be easily withdrawn from the air cylinder when desired.

In use the hollow extension 2 is slipped over the valve stem of the tire and a stud 15 which projects below the partition 3, presses down the stem of the valve which permits air to enter through the port 4 and force up the piston 7 to a position corresponding to the extent that the air pressure is capable of overcoming the spring 8. The indicating device 11 having been pressed down until its lower end bears against the piston 3, the sleeve 12 is then pushed down until it contacts with the disk 9 as shown in Fig. 2, then the indicating device is lifted out of the air cylinder with the sleeve 12 still in the same position so that after having been removed from the air cylinder, the figure which is exposed below the sleeve 12 will indicate the pressure. Or if desired, tube 11 need not be removed at all, as the numeral above the sleeve 12 could be used to indicate the pressure, in which event, obviously, the tube 11 would be graduated with a scale to correspond.

If desired, the air cylinder could be screwed to the air valve of the tire as shown in Fig. 6, and could remain there at all times, there being an air cylinder screwed to each valve. In such use preferably a cap 16 would be applied to the top of the air cylinder to prevent the escape of any air, which might leak past the piston as when in such position the stud 15 would hold open the valve, and permit air to enter the air cylinder. And while the leakage past the piston might be very slight it would result in a considerable reduction in pressure after a few days. When used in this manner, to determine the air pressure, the cap 16 would be removed and then the registering device 11 would be inserted. If before the insertion thereof sleeve 12 be placed near the lower end of the registering device 11, during the insertion of the registering device the downward pressure of the same will result in forcing the sleeve 12 upward. After the end of the registering device 11 has been brought in contact with the piston 7, and sleeve 12 has been placed in contact with the top of the disk 9, the registering device with its sleeve 12 may be removed from the air cylinder and held in a convenient position for reading, the cap 16 having been replaced on the air cylinder for the reasons above pointed out to prevent further escape of air.

What I claim is:

1. A pressure gage comprising an air cylinder having a part to engage a tire valve or the like, a pressure responsive element in said cylinder, a detachable registering device adapted to be projected slidably into said cylinder, and adapted to contact with said pressure responsive element in its various actuated positions, and an indicator frictionally slidable on said registering device at a point without the cylinder.

2. A pressure gage comprising a cylinder, a piston therein, a spring for depressing the piston, a partition in the cylinder forming at one end of the cylinder a hollow portion adapted to communicate with the air valve of a pneumatic tire, the partition having a port and a stud adapted to depress the stem of the valve, a registering device separate from said piston slidable in the cylinder above the piston and protruding from the end of the cylinder, and a sleeve frictionally slidable on the registering device outside of and adapted to contact with the end of the cylinder, the registering device having indicating marks.

3. A pressure gage comprising an air cylinder, a piston therein, a spring resisting outward movement of the piston, a removable registering device slidable in the cylinder above the piston, and a sleeve slidable on the registering device and adapted to be moved against the end of the air cylinder, the registering device having indicating marks.

4. A pressure gage comprising a cylinder, an end piece at one end of the cylinder having an opening therethrough, a piston in the cylinder, a spring interposed between the piston and end piece, a registering device comprising a bodily removable rod loosely extending through the opening in said end piece, the lower end of the rod being adapted to rest upon the outer surface of the piston, and the outer end thereof projecting beyond the outer end of the cylinder, and a sleeve slidable on the rod without the cylinder, the said rod having indicating marks.

In testimony whereof, I have hereunto set my hand at Los Angeles, California this 21st day of July 1910.

JUNIUS A. BOWDEN.

In presence of—
 G. T. HACKLEY,
 P. H. SHELTON.